(12) United States Patent
Tuli

(10) Patent No.: US 8,033,351 B2
(45) Date of Patent: Oct. 11, 2011

(54) THERMO-ELECTRIC, RECHARGEABLE VEHICLE POWERING SYSTEM

(76) Inventor: Raja Singh Tuli, Montreal (CA)

(\*) Notice: Subject to any disclaimer, the term of this patent is extended or adjusted under 35 U.S.C. 154(b) by 0 days.

(21) Appl. No.: 12/261,617

(22) Filed: Oct. 30, 2008

(65) Prior Publication Data

US 2010/0108415 A1    May 6, 2010

(51) Int. Cl.
    *B60W 10/24* (2006.01)
(52) U.S. Cl. ................................ 180/65.29
(58) Field of Classification Search ..... 180/65.21–65.29
    See application file for complete search history.

(56) References Cited

U.S. PATENT DOCUMENTS

| | | | |
|---|---|---|---|
| 3,894,605 A * | 7/1975 | Salvadorini | 180/65.245 |
| 5,634,339 A * | 6/1997 | Lewis et al. | 60/650 |
| 6,202,782 B1 * | 3/2001 | Hatanaka | 180/301 |
| 7,000,389 B2 * | 2/2006 | Lewellin | 60/512 |
| 7,254,953 B2 * | 8/2007 | Callas et al. | 62/3.7 |
| 7,625,647 B2 * | 12/2009 | Burch | 429/17 |
| 2008/0110189 A1 * | 5/2008 | Alston et al. | 62/236 |
| 2008/0223632 A1 * | 9/2008 | Bartilson | 180/65.2 |
| 2009/0277702 A1 * | 11/2009 | Kanada et al. | 180/65.29 |

\* cited by examiner

*Primary Examiner* — J. Allen Shriver, II
*Assistant Examiner* — Erez Gurari

(57) ABSTRACT

The present invention generally relates to the technical field of motive power systems for automotive vehicles that convert stored thermal energy into electricity for energizing electric motors to drive a vehicle. The invention discloses several devices that integrate the vehicle powering system, including a programmable regulator, a thermal energy storage section, a heat energy converter section and an electric energy storage section. All said elements are incorporated in the same vehicle, with the wheels being ultimately propelled by electric motors. The combination of the devices disclosed results in improved efficiency in the conversion of input energy to drive a vehicle.

18 Claims, 3 Drawing Sheets

THERMO-ELECTRIC, RECHARGEABLE VEHICLE POWERING SYSTEM

FIELD OF THE INVENTION

The present invention generally relates to the technical field of motive power systems for automotive vehicles that convert stored thermal energy into electricity for energizing electric motors to drive a vehicle.

The invention discloses several devices that integrate the vehicle powering system, including a programmable regulator, a thermal energy storage section, a heat energy converter section and an electric energy storage section. All said elements are incorporated in the same vehicle, with the wheels being ultimately propelled by electric motors. The combination of the devices disclosed results in improved efficiency in the conversion of input energy to drive a vehicle.

BACKGROUND OF THE INVENTION

The high energy density of thermal energy storage systems favors their use in vehicle propulsive systems. Unfortunately, the state of the art thermal vehicles have the inconvenience of low energy conversion efficiency. The state of the art electric vehicles that depend entirely on battery-stored energy for range have their design specifications limited by the requirements imposed by battery arrays that are heavy, bulky and expensive. These inconveniences have been cited in several documents, of which an example is a technical paper entitled "The Thermal Vehicle—A Pollution Free Concept" by Jack R. Kettler presented at the "Tenth Intersociety Energy Conversion Engineering Conference" held on Aug. 18-22, 1975.

SUMMARY OF THE INVENTION

The present invention overcomes the limitations of the prior art regarding both conversion efficiency and range by storing the motive energy in the form of thermal energy, and then converting it to electric energy only as needed. For thermal energy storage it utilizes a container filled with a thermal energy storing material, for instance a salt. The higher energy density of the molten salt technology compared to the standard Lithium ion battery technology, associated with the quick and efficient conversion into electric energy to replenish the storage/driving battery reduces the range requirement for the battery to a level in which the current battery technology compromises neither the design of the vehicle nor its performance.

According to a certain aspect of the present invention, the thermo-electric vehicle powering system comprises a thermal energy storage section that utilizes an external energy source to provide thermal energy to be transferred to a thermal energy storage device which is incorporated in the vehicle itself; means for performing a controlled transfer of the thermal energy from the thermal energy storage section to a heat energy converter section; a heat energy converter section comprising a heat engine that converts thermal energy into electrical energy; an electric energy storage section that stores the electrical energy output by the heat energy converter section; a set of electric motors powered by the energy supplied by the electric energy storage section and driving the wheels of the vehicle; a set of sensors that continually monitor the charge status of the electric energy storage section and a programmable regulator that receives information from the set of sensors and controls the transfer of thermal energy from the thermal energy storage section to the heat energy converter section.

One of the problems addressed by the present invention is the irregular profile of power demand by the electric motors that ultimately drive the vehicle wheels. On average, the electric motors energy consumption is in the same range of the electric output of the heat energy converter section, about 2 KWh. However upon accelerating the electric motors demand approximately 120 KWh for a short period of time, causing a quick depletion of the electric energy storage section.

For the sake of conversion efficiency and other reasons which will be detailed below, the heat energy converter section of one embodiment of the present invention is run intermittently, which means its output varies over time. The coupling of the irregular output of the heat energy converter section with the also irregular input demand of the electric motors that move the vehicle wheels is critical for the operability of the invention.

Another aspect to consider is the fact that the energy conversion efficiency of the thermal engine element integrated in the system varies according to the regime in which it operates. More specifically, its efficiency is maximized for a particular value of rpm, and variations from said regime entail an overall efficiency loss.

Another aspect to consider is the different features of the thermal energy system and the electric energy system. The electric energy system features reasonably high energy conversion efficiency, but a low energy density. The thermal energy system features comparatively low energy conversion efficiency, but a higher energy density. The design requirements of the vehicle powering system according to the present invention must manage to balance vehicle range and overall energy conversion efficiency.

It is therefore an object of the present invention to provide means for regulating and stabilizing the electric energy output of the heat energy converter section, which is run intermittently.

Another object of the present invention is to provide means for matching the output of the heat energy converter section with the input demand of the electric motors that move the vehicle wheels over time.

Another object of the present invention is to provide means for improving the efficiency of the thermal engine element integrated in the system by regulating its operational regime.

The above as well as additional features and advantages of the present invention will become apparent in the following written detailed description.

BRIEF DESCRIPTION OF THE DRAWINGS

A more complete understanding of the present invention may be had by reference to the following detailed description when taken in conjunction with the accompanying drawings, wherein.

Where used in the various figures of the drawing, the same numerals designate the same or similar parts.

DETAILED DESCRIPTION

Figure 1:
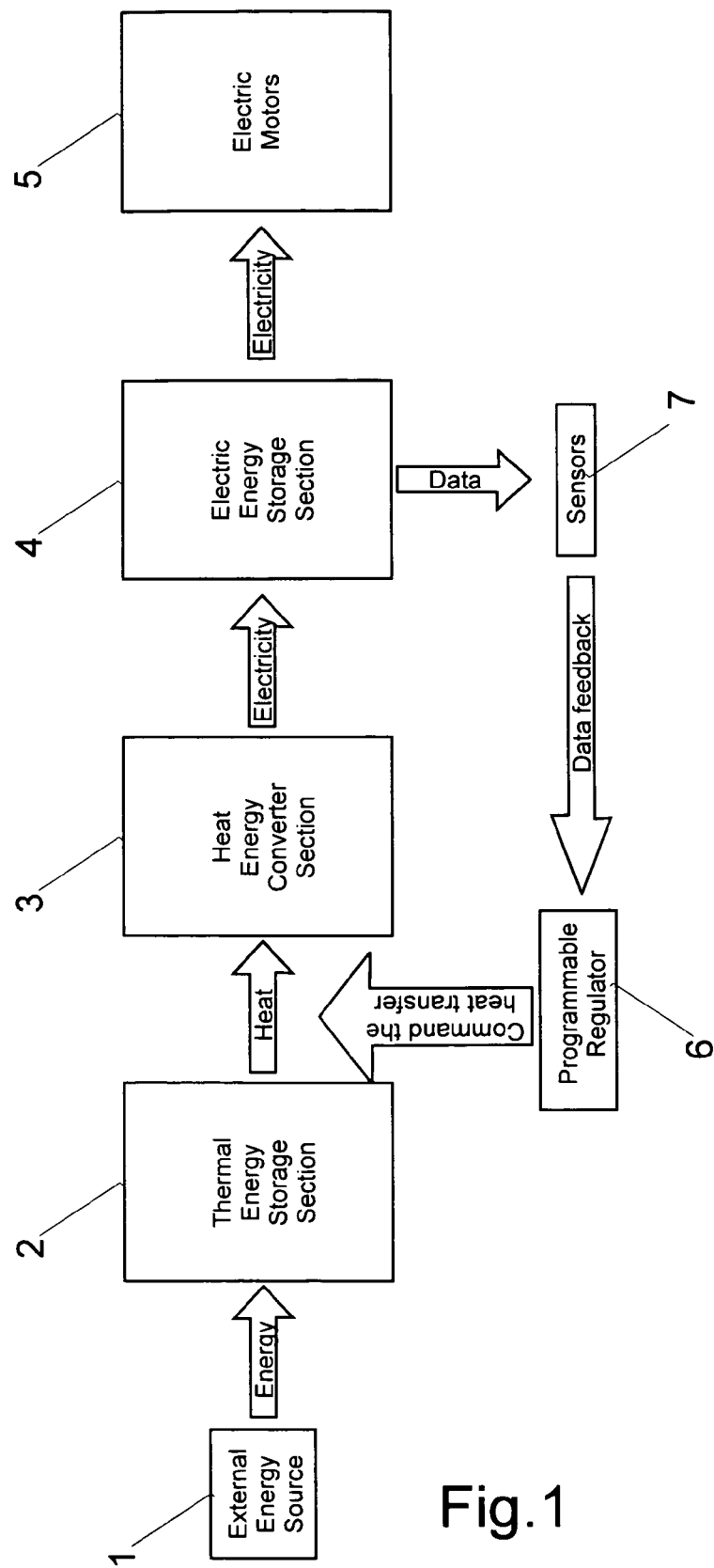
FIG. 1 is a schematic drawing illustrating the component elements according to the present invention.

The system of the present invention combines a thermal energy storage section (2), a heat energy converter section (3) and an electric energy storage section (4) in the same vehicle, with the wheels being ultimately propelled by electric motors. These sections are now described in order, addressing each of their elements. The arrangement of these sections can be visualized in the schematic drawing of FIG. 1.

Figure 2:
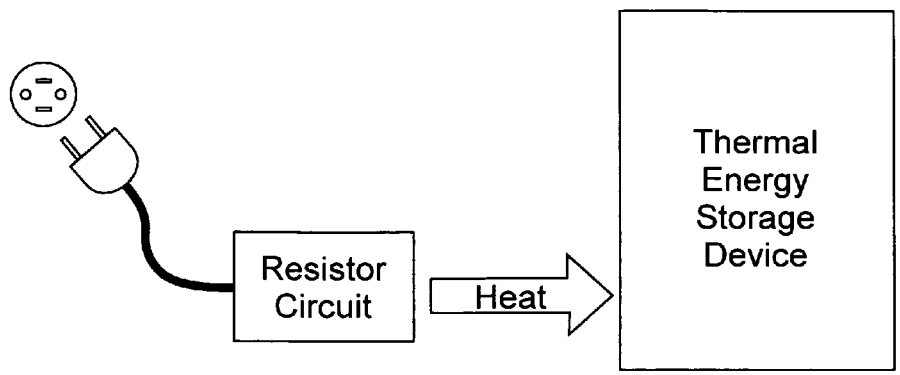
FIG. 2 is a schematic drawing illustrating the basic elements involved in the replenishment of the thermal energy storage device from a domestic electric power outlet.

The thermal energy storage section (2) utilizes an external energy source (1) to provide thermal energy to be transferred to a thermal energy storage device which is incorporated in the vehicle itself. The external energy source (1) can be for instance a domestic electric power outlet connected to a resistor circuit that converts the electric energy input into heat output. Said arrangement is illustrated by FIG. 2. It can also be a domestic solar energy concentrator array, which has the advantage of avoiding the step of initial energy conversion from the power outlet's electric energy into thermal energy. The charging of the thermal energy storage device is typically performed by transferring the heat from the external energy source (1) by means of conduction and/or convection. The thermal recharge can optionally be performed by replacing the contents of said thermal energy storage device as detailed further below. The thermal energy storage device comprises a sealed, non-pressurized, thermal insulated container integrated in the vehicle itself. Said container is filled with a thermal energy storing material, for instance water, particulate metals or a salt. For the purposes of the present invention the specific heat capacity is especially relevant, and salts provide a good choice. Various different salts can be chosen according to the design and performance requirements of the thermal energy storage section. Examples of useable salts found in the state of the art are LiH, B2O3, LiF, NaF, MgCl2 and NaCl. One preferable embodiment of the present invention that uses salt as thermal energy storing material takes advantage of the increased heat capacity of salts when submitted to phase change. Upon changing phases from solid to liquid, a properly chosen salt is capable to absorb a large amount of heat. Thanks to its thermal insulation, the storage container where the molten salt is kept looses no more than 1 or 2% of its thermal energy load per day. The dimensioning of the container is performed considering vehicle design specifications such as range, vehicle weight and maximum load. Compared to other means of energy storage such as for example standard Lithium ion batteries, the thermal energy storage section of the present invention features a longer life cycle, its eventual disposal is ecologically safer and the manufacturing cost is lower. In an alternative embodiment of the present invention the replenishment of the vehicle's heat charge is performed through replacement of the thermal energy storing material inside the thermal container by a hotter load of the same material.

The heat energy converter section (3) of the present invention utilizes a working fluid circulating inside a closed circuit piping arrangement to draw thermal energy from the vehicle's thermal energy storage device and drive a heat engine that converts said thermal energy into mechanical torque, being said torque converted into electric energy by means of an alternator coupled to the heat engine output shaft. The working fluid can be for instance a mixture of air and water, optionally with performance enhancing additives. The flow of said working fluid through the piping is controlled by means of a set of check/bypass/globe valves. The operation of said valves allows full control of the working fluid movement and therefore of the amount of heat drawn from the energy storage device as well as the heat engine's operational regime (rpm), including the options of interrupting flow altogether or simply bypassing the heat engine, which stops the drawing of heat from the thermal storage unit and causes the shutting down of the heat engine. The operation of the set of valves herein disclosed is controlled by feedback signals from a programmable Regulator (6) which will be detailed further below. The heat engine of the present invention can be for instance a steam turbine, a Stirling engine, an Ericsson engine or any other heat engine that can be driven by working fluid expansion and that is capable of transforming heat energy in mechanical torque to drive the alternator. The running of the heat engine ultimately yields electrical power output by the alternator.

In an alternative embodiment of the present invention, the conversion of the thermal energy to electric energy is performed by an array of photocells incorporated inside the thermal insulated container. The electromagnetic waves irradiated from the thermal energy storing material impinge on the photocells and are converted into electric energy which is stored in a battery.

Another alternative embodiment of the present invention contemplates the conversion of the thermal energy to electric energy by thermo electric means using a thermal coupling that yields a certain voltage, according to the principles of the Seebeck effect. It uses two metal plates, where one of them is kept at a temperature that is higher than the temperature of the other plate, with said thermal gradient producing a voltage across said plates. Presently the conversion efficiency is between 7 and 15%, though it is expected to improve with further research and development of the concept.

The electric energy storage section (4) of the present invention utilizes for example a supercapacitor array battery, a Lithium ion battery, a NiCd battery, a NiMH battery or a similar battery to regulate and stabilize the output of the heat energy converter section. As detailed further below, the electric energy stored in the electric energy storage section (4) is eventually used to power a set of electric motors (5) that actually drive the vehicle's wheels. On average the electric motors (5) energy consumption is in the same range of the electric output of the invention's alternator, about KWh. However upon accelerating the electric motors (5) demand approximately 120 KWh for a short period of time, causing a quick depletion of the battery of the electric energy storage section (4). The storage capacity of the regulation battery of the electric energy storage section (4) is enough to cope with said brief peaks of motor demand without requiring replenishment in such a high rate that the heat energy converter section (3) cannot deliver.

The storage capacity of said regulation battery is also enough to store any excess energy generated by the heat engine that is not being simultaneously consumed by the vehicle's electric motors (5), avoiding the waste of said energy and thus preserving overall energy conversion efficiency. The accumulation of said excess energy in the regulation battery is used as a signal to trigger the switching off of the heat engine in a timely fashion, as will be detailed further below. The regulation battery of the electric energy storage section (4) continually couples the output of the heat energy converter section with the variable power demand of the electric motors.

Aside from its regulation functions, the system of the present invention utilizes the regulation battery of the electric energy storage section (4) to store both the electric energy output from the alternator described above and an initial electric charge, obtained for example from a domestic electric power outlet. In the preferred embodiment of the present invention, an external electrical power source is used to charge the battery of the electric energy storage section (4) up to capacity before the start of every trip or whenever said external electrical power source is conveniently available. Whether coming originally from an external electric power source or from the heat energy converter section's alternator, the electric energy stored in the electric energy storage section is eventually used to power the set of electric motors (5), which purpose is to convert said electric energy into mechanical torque to drive the vehicle wheels.

Under normal traffic conditions, the power requirements of the vehicle electric motors (5) vary due to factors such as vehicle acceleration profile and inclination of the road. These can deplete the battery of the electric energy storage section (4) very fast, requiring timely replenishment of its charge according to the battery's design—aspects such as capacity, recharging speed and charging efficiency—in order to avoid both the stopping of the vehicle and irreversible damage to the battery itself. Battery charge exhaustion is not the only inconvenience to avoid, as battery overcharge also causes problems. Under circumstances such as extended idling on heavy traffic, with alternator output higher than the vehicle's electric motors demand, the full charge state might be quickly reached and any additional charging can cause irreversible damage to the battery. Therefore it is necessary to introduce means to harmonize the power consumption of the electric motors (5) with the electric power recharge provided by the running of the heat engine used to replenish the battery of the electric energy storage section (4) in the absence of an external electric power source.

According to the present invention, a set of sensors (7) detects battery data such as charge status and rate of charge variation over time. Said battery data is continually relayed in real time to the programmable Regulator (6) that harmonizes the electric power consumption and generation in the vehicle. Said Regulator (6) provides a feedback signal that controls the operation of the set of check/bypass/globe valves, which in turn control the flow of the working fluid that drives the heat engine of the heat energy converter section (3). Thus said Regulator effectively controls the switching on and off of the heat engine, which torque output drives the alternator that ultimately charges the battery of the electric energy storage section (4).

Figure 3:
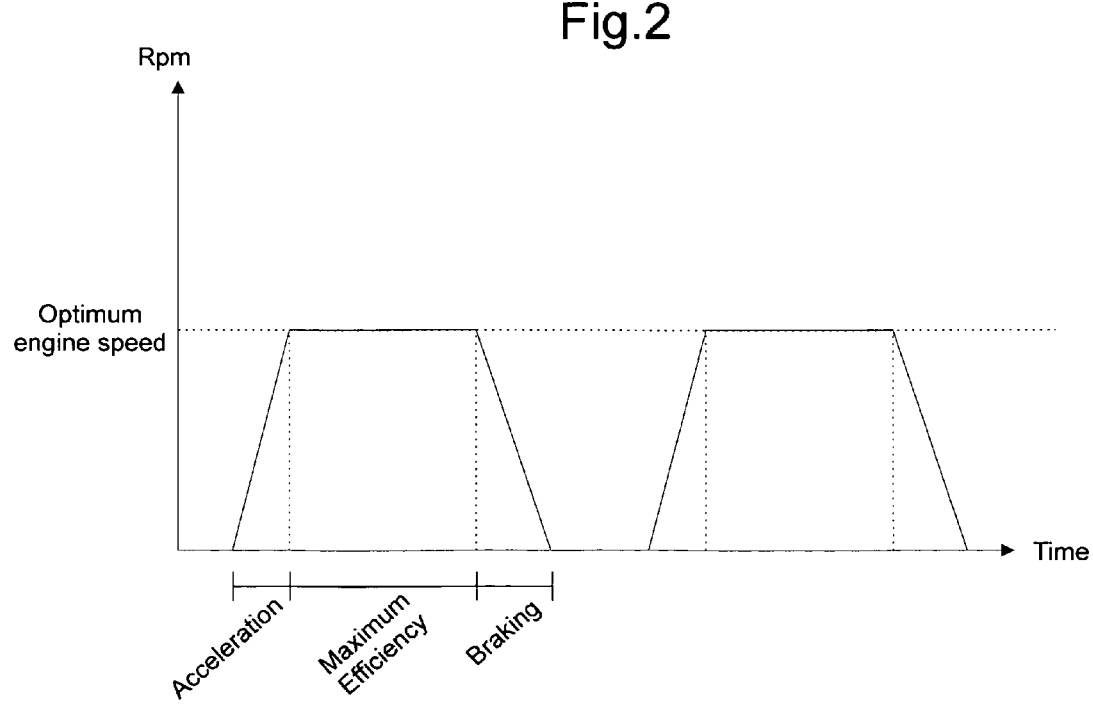
FIG. 3 is a graphic illustrating the operational pattern of the heat energy converter section according to the present invention.

The switching of the heat engine is however critical to the energy conversion efficiency purposes of the present invention. If the operational regime of the heat engine is changed frequently, its overall energy conversion efficiency is reduced. The best conversion efficiency results are achieved when the heat engine is kept running at its optimal output regime (rpm). For practical reasons it is not desirable to keep the heat engine running indefinitely, so an operational compromise is reached by intermittently switching it on and off as seldom as possible, and running it only at its optimal output regime. This proposed operational pattern is illustrated by FIG. 3. Said operational compromise is achieved by proper programming of the invention's Regulator. The programming of said Regulator (6) ensures that the heat engine is switched on and off in a timely fashion in order to ensure that the battery charge is continually kept between the limits prescribed for each particular combination of vehicle and battery. In other words, battery charge and depletion beyond the prescribed limits of the battery are avoided by combining proper dimensioning of the battery of the electric energy storage section (4) with suitable programming of the invention's Regulator (6). Therefore the programmable Regulator is capable of detecting the eventual depletion of the battery to a previously set lower limit, switch open the set of valves in order to start the running of the heat engine and thus drive the alternator which output recharges the battery. The same Regulator is capable of detecting the reaching of a higher charge limit beyond which the battery could suffer damage from overcharging, command the closing of the set of valves in order to stop the running of the heat engine and thus stop the alternator, thus interrupting the recharging of the battery.

The lower and higher battery of the electric energy storage section (4) charge limits described above are programmed into the Regulator (6) according to the specified requirements of each type of vehicle and its particular thermal energy storage, heat energy converter and electric energy storage sections. In one exemplary embodiment of the present invention, the Regulator (6) monitors the charging level of the battery of the electric energy storage section (4) and shuts off the circulation of the working fluid that drives the heat engine whenever said battery charging level reaches 95%, switching it open again when said charging level reaches 20%. Depending on the battery charging level and also on how steep the discharge profile is, the Regulator triggers the heat engine to run early, late or does not trigger it at all. The programming of the Regulator is such that the steeper the battery discharge profile, the earlier the switching of the heat engine, always observing the heat engine's optimal output regime. Therefore the Programmable Regulator (6) of the present invention is able to cope with the dynamic, variable electric power demands of the vehicle's electric motors (5) and also prevent overcharging of the battery of the electric energy storage section (4).

According to the present invention, the set of sensors (7) continually relays data on the battery's charge status to the programmable Regulator. The Regulator receives this information, confronts it with the lower and higher battery charge limits described above and transmits the corresponding control signals to the valves that control the working fluid circuit flow.

The programmable Regulator (6) controls means—for example servo-motors—that are capable of operating the set of check/bypass/globe valves continually from their fully open to their fully closed positions. This mechanical control of the fluid circulation by the valves, ultimately controls the running of the heat engine of the heat energy converter section (3), which cyclic movement is driven by the movement of the working fluid. Therefore the programmable Regulator (6) imparts a feedback control signal from the battery charge sensors (7) to the set of valves that ultimately controls the running of the heat engine of the heat energy converter section (3), causing the circuit valves to react—opening, closing or adjusting the flow—according to the charge status of the battery of the electric energy storage section (4).

The vehicle powering system is designed to fit the operational requirements of the vehicle it equips, which for example can be a compact passenger car, a family car or a bus. For each type of vehicle the thermal energy storage section (2), heat energy converter section (3) and electric energy storage section (4) have different specifications. Said vehicle is hereinafter denominated the design vehicle. In order not to compromise the vehicle's design, the battery of the electric energy storage section (4) should have the smallest volume and weight that allows the vehicle to meet its specified performance.

According to the present invention, the capacity of the battery of the electric energy storage section (4) is large enough to cope with the anticipated power demands of the design vehicle. Data such as the frequency, intensity and duration of acceleration manoeuvres, vehicle dry and loaded weight and other similar characteristics are computed upon the preliminary dimensioning of the battery for that specific design vehicle. The preliminary dimensioning is such that the battery's capacity is large enough to cope with a design-specified peak power demand for a design-specified period of time without depleting the battery's charge beyond the prescribed lower limit for that battery. Said dimensioning is termed preliminary because it contemplates only the electric motor power demand for the design-specified period of time, with no concern for battery recharging factors such as the intermittent running of the heat engine.

Once the preliminary battery capacity is calculated, this number is confronted with the electric power output of the design vehicle's heat energy converter section (3), namely the alternator and its associated heat engine. According to the present invention, the heat engine is run intermittently and then only at its ideal regime, namely the one which yields maximum conversion efficiency. This characteristic output of the heat engine indicates the number of Kwh that the heat energy converter section (3) generates, and therefore the time it requires to provide a certain amount of electric charge to the vehicle's battery of the electric energy storage section (4). Given the designed feature of constant output of the heat engine/alternator, this time is directly related to the shut-off periods of the heat engine. A more powerful heat engine can be shut-off for longer periods, or be run for shorter periods at a time.

Ideally the heat engine should be switched on and off with the lowest possible frequency in order to preserve energy conversion efficiency, because every time the heat engine is switched on and off its inertia imposes a brief period of non-optimal regime, which results in overall conversion efficiency loss. However, the frequency of heat engine switching is subject to the design vehicle's battery capacity. A small capacity battery requires the heat engine to be switched more frequently, or to be run for longer periods when switched on. Therefore the preliminary dimensioning of the battery must be eventually revised to contemplate this aspect. Said revision yields the final battery dimensioning specifications.

The final dimensioning is such that the battery's capacity is not only large enough to cope with a design-specified peak power demand for a design-specified period of time without depleting the battery's charge beyond the prescribed lower limit for that battery. It is also large enough to ensure the timely recharging of the battery by the heat engine deployed in that specific vehicle design without ever depleting the battery's charge beyond the prescribed lower limit for that battery. Therefore the final battery dimensioning specifications contemplate both the design peak load and the ability of the heat engine to replenish it over time. Consequently the designed use of the vehicle will never deplete the battery faster than the intermittent running of the vehicle's own heat engine is capable of compensating by replenishing the battery.

An alternative embodiment of the present invention replaces the regulation battery of the electric energy storage section (4) described above with a battery of similar technology but much larger capacity, enough to afford the vehicle a 40 km range without replenishment of the battery's charge. By means of such battery upgrade the vehicle design of the present invention evolves to incorporate both thermal energy storage (hot salt container) and electric energy storage (battery) into what is termed a hybrid system. The purpose of said arrangement is to improve the overall efficiency of the vehicle powering system regarding energy conversion while at the same time making feasible the option of trips more than 40 km long without requiring replenishing the battery from an extravehicular power source. The upgraded battery can be for example a supercapacitor array battery, a Lithium ion battery, a NiCd battery, a NiMH battery or any other battery that combines a volume small enough to avoid compromising the vehicle's design and performance, a storage capacity large enough to allow the vehicle a 40 km range without replenishment of the battery's charge and a reasonably high energy conversion efficiency.

The hot salt container of the present example (thermal energy storage) features an energy conversion efficiency of about 50%, which means that for every 100 Kwh it takes from the domestic electric power socket it eventually outputs only 50 Kwh. In contrast, a Lithium ion battery (electric storage) for example features an energy conversion efficiency of about 90%, therefore higher than that of the thermal device. However this simple comparison of conversion efficiency fails to address another aspect that is fundamental for the practical operation of a vehicle: range, which is directly related to storage capacity. Electric batteries such as the Lithium ion model of the proposed example feature a low energy density. This means that the volume of battery required to store the amount of energy required for a given vehicle trip becomes prohibitively large as the trip range increases. This capacity limitation is much less intense in the case of the thermal energy storage device, because its energy density is about twice that of a Lithium ion battery. In simpler terms, it is possible to store twice the amount of energy in a thermal energy storage device than would be possible in a Lithium ion battery of the same volume, but with lower conversion efficiency.

Statistical analysis of typical trip profiles reveals that most vehicle trips are shorter than 40 km long. For such a range a reasonably compact, small capacity Lithium ion battery is enough, because it can store the energy required to power the vehicle electric motors on its own without requiring replenishment. Assuming that the Lithium ion battery can be replenished from an extra-vehicular power source between consecutive trips, the vehicle's energy conversion efficiency would be that of the Lithium ion battery, that is about 90%.

For trips longer than 40 km the Lithium ion battery would reach an undesirably low charging state, entailing possible damage to the battery itself as well as causing the eventual stop of the vehicle for lack of power. According to the present invention, the programmable Regulator monitors the Lithium ion battery charge state and switches the heat engine on to start replenishing the battery in time to avoid the reaching of said low charging state.

Therefore the incorporation of both thermal and electric storage sections on the present invention vehicle makes trips longer than 40 km possible thanks to the thermal energy storage section ability to recharge the compact Lithium ion battery, and increases the overall energy conversion efficiency of the system through the combination of both energy storage means in the same vehicle. The present invention implementation of the programmable Regulator (6) to manage the energy balance between the vehicle's thermal storage unit and electric storage unit combines the better conversion efficiency of the Lithium ion battery with the higher energy density of the thermal energy storage device, yielding an increase in the overall conversion efficiency of the vehicle's powering system. The resulting system's conversion efficiency is somewhere between that of the thermal energy storage device (50%) and that of the Lithium ion battery (90%) depending on the length of the trip.

The present invention's Regulator (6) is special in the sense that it not merely switches the heat engine on and off, but does so by opening or closing the circulation valves of the working fluid in a manner that ensures both the most efficient regime for the heat engine to be run for the most efficient running schedule, but also that the charge requirements of the specific driving battery is met. In fact without such specific regulation the synergic effect achieved by the matching of the various elements that comprise the present invention would not be reached, because overall efficiency would be lower than that of a pure Lithium ion system.

Figure 4:
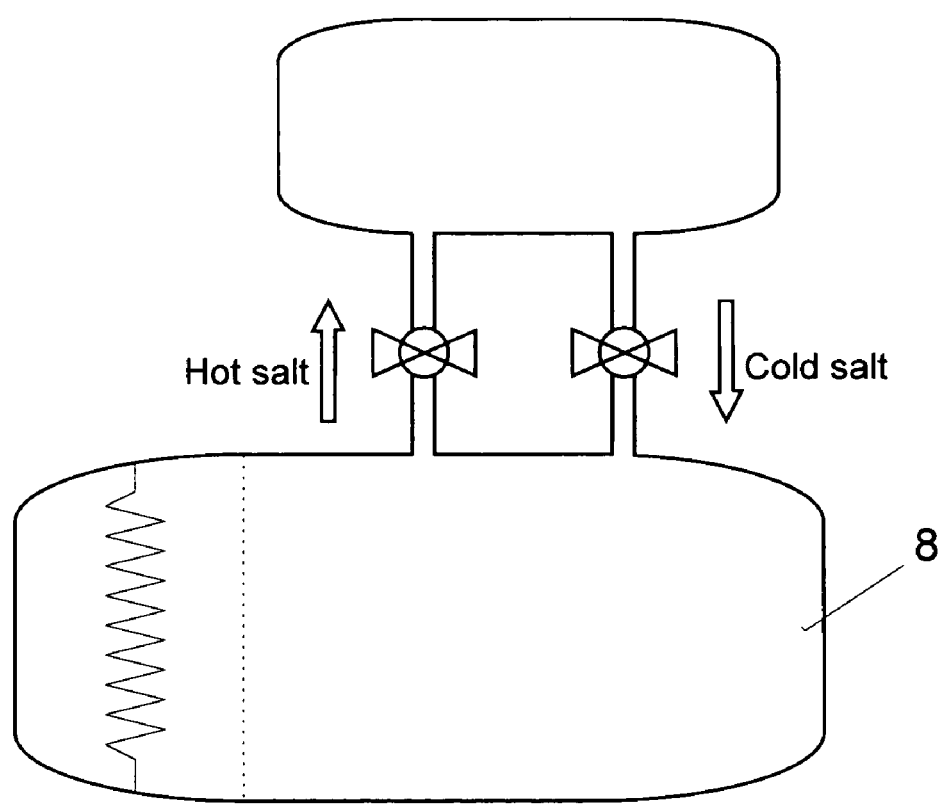
FIG. 4 illustrates an alternative embodiment of the present invention in which there are two separate containers for the thermal energy storing material.

In an alternative'embodiment of the present invention there are two separate containers for the thermal energy storing material. The running of the vehicle's heat engine results in the eventual cooling down of the thermal energy storing material, which eventually compromises the performance of the powering system. As seen in FIG. 4, by incorporating a second, separate container (8) for the thermal energy storing material it is possible to replace the thermally exhausted volume of salt with a hotter load previously stored in said second container (8), according to system operational requirements. The hotter thermal energy storing material would be displaced towards the container from which the system draws heat to drive the heat engine, while the exhausted thermal energy storing material would swap position with the hotter one by moving into the second container it previously occupied. In case of heating of the exhausted thermal energy storing material from an external heat source, the colder salt load could be heated in conditions of thermal isolation from the hotter salt load. An example of said arrangement is illustrated on FIG. 4.

In an alternative embodiment of the present invention the programmable Regulator (6) employs the data yielded by the monitoring of battery discharge rate over time to establish a driver profile. An aggressive driving style involving extended acceleration bursts and high average speed would be reflected by quicker battery charge depletion, whereas a conservative driving style involving frugal acceleration and lower average speed would entail a slower battery discharge pattern. According to the present invention, the battery replenishment management is customized according to the driver's established profile.

As described above, lower and higher battery charge limits are programmed into the Regulator (6) according to the specified requirements of each type of vehicle and its particular thermal energy storage (2), heat energy converter (3) and electric energy storage (4) sections. Given the design's fixed output of the heat engine, the quicker battery discharge pattern imposed by an aggressive driving style would require an early start of the heat engine. Failure to do so could result in the lower battery charge limit being reached before the heat engine has had time to compensate the sudden battery charge depletion. Conversely, the slower battery discharge pattern entailed by a conservative driving style can be capitalized upon by a later start of the heat engine, which translates into less frequent switching of the heat engine and higher overall energy conversion efficiency.

In one exemplary embodiment of the present invention, the Regulator (6) will command the opening of the valves to allow circulation of the working fluid that drives the heat engine whenever the battery charging level is 20% above the lower battery charge limit if the detected driver profile is conservative, but would do so at 40% above the lower battery charge limit if the driver profile is aggressive.

Furthermore, the programmable Regulator (6) uses the data yielded by the battery sensors (7) to compile historical data series for that particular vehicle. These are in turn used to maintain a continually updated record that reflects the road conditions in which that specific vehicle has been driven, the typical length of trips between replenishments from an external energy source and the eventual degradation of systems for that specific vehicle, such as the battery and salt tank. Said updated vehicle record is factored into the battery replenishment management exactly like the already described driver profile, thus ensuring that the management of the vehicle's energy resources is kept on the safe side and is always up to date regarding the present vehicle conditions.

While this invention has been particularly shown and described with reference to a preferred embodiment, it will be understood by those skilled in the art that various changes in form and detail may be made therein without departing from the spirit and scope of the invention. The invention in its broadest, and more specific aspects, is further described and defined in the claims which now follow.

I claim:

1. A thermo-electric vehicle powering system comprising:
a thermal energy storage section;
means for performing a controlled transfer of the thermal energy from the thermal energy storage section to a heat energy converter section;
a heat energy converter section comprising a heat engine that converts thermal energy into electrical energy;
an electric energy storage section that stores the electrical energy output by the heat energy converter section;
a set of electric motors powered by the energy supplied by the electric energy storage section and driving the wheels of the vehicle;
a set of sensors that continually monitor the charge status of the electric energy storage section;
a programmable regulator for efficient electric power consumption and generation, that receives information from said set of sensors and, whenever the charging level of said electric energy storage section falls under a previously set limit value, activates said means for performing a controlled transfer to convert thermal energy into electrical energy for replenishing the electric energy storage section wherein the thermal energy storage section comprises a sealed, non-pressurized, thermal insulated container filled with a thermal energy storing material that can be heated from an external source or replaced by another load.

2. Vehicle powering system according to claim 1, in which the means for performing a controlled transfer of the thermal energy from the thermal energy storage section to the heat energy converter section comprise a working fluid circulating inside a closed circuit piping arrangement, being the flow of the working fluid through the piping controlled by means of a set of valves.

3. Vehicle powering system according to claim 1, in which the heat energy converter section comprises any one of a steam turbine, a Stirling engine or an Ericsson engine.

4. Vehicle powering system according to claim 1, in which an array of photocells incorporated inside the thermal insulated container replaces the heat engine in the heat energy converter section.

5. Vehicle powering system according to claim 1, in which thermo electric means using a thermal coupling that yields a certain voltage, according to the principles of the Seebeck effect replace the heat engine in the heat energy converter section.

6. vehicle powering system according to claim 1, in which the heat engine of the heat energy converter section is driven by working fluid expansion for transforming heat energy in mechanical torque.

7. Vehicle powering system according to claim 1, in which the heat energy converter section is run intermittently, with every run being performed at a fixed speed corresponding to the heat engine's optimal output regime.

8. Vehicle powering system according to claim 1, in which the heat energy converter section initiates the replenishment of the electric energy storage section every time the charging level of the electric energy storage section reaches a previously set lower limit.

9. Vehicle powering system according to claim 1, in which the heat energy converter section interrupts the replenishment of the electric energy storage section every time the charging level of the electric energy storage section reaches a previously set higher limit.

10. Vehicle powering system according to claim 9 or 9, in which the previously set limits for the charging level of the electric energy storage section are programmed into the regulator according to the specified requirements of each type of vehicle and its particular thermal energy storage, heat energy converter and electric energy storage sections.

11. Vehicle powering system according to claim 9 or 9, in which the programmable regulator employs the data yielded by the set of sensors that continually monitor the charge status of the electric energy storage section to establish a driver profile, and adjusts the limits for the charging level of the electric energy storage section according to the established profile.

12. vehicle powering system according to claim 1, in which the capacity of the electric energy storage section is dimensioned to ensure that, considering the programming of the regulator for the specific vehicle at hand, the time it takes to deplete its charging state beyond the previously set lower limit is longer than the time required for the heat energy converter section to replenish it.

13. Vehicle powering system according to claim 1, in which an external electrical power source is used to charge the electric energy storage section up to capacity before the start of every trip or whenever said external electrical power source is available.

14. vehicle powering system according to claim 1, in which there are two separate containers for the thermal energy storing material.

15. Vehicle powering system according to claim 1, in which the programmable regulator uses the data yielded by the set of sensors to compile historical data series on the charge status of the electric energy storage section for that particular vehicle, being said data factored into the regular updating of the charging limits programmed into the regulator.

16. vehicle powering system according to claim 1, in which the set of sensors that continually monitor the charge status of the electric energy storage section transmit to the regulator both the instantaneous charge status and the rate of charge variation over time.

17. vehicle powering system according to claim 1, in which the regulator controls a set of valves that in turn control the movement of a working fluid which performs the transfer of thermal energy from the thermal energy storage section to the heat energy converter section, including the options of interrupting flow altogether or simply bypassing the heat energy converter section.

18. A thermo-electric vehicle powering system comprising:
    a thermal energy storage section;
    means for performing a controlled transfer of the thermal energy from the thermal energy storage section to a heat energy converter section;
    a heat energy converter section that converts thermal energy into electrical energy;
    an electric energy storage section that stores the electrical energy output by the heat energy converter section;
    a set of electric motors powered by the energy supplied by the electric energy storage section and driving the wheels of the vehicle;
    a set of sensors that continually monitor the charge status of the electric energy storage section;
    a regulator for efficient electric power consumption and generation, that receives information from said set of sensors and, whenever the charging level of said electric energy storage section falls under a previously set limit value, activates said means for performing a controlled transfer to convert thermal energy into electrical energy for replenishing the electric energy storage section, wherein, based on the average demand of the electric motors for that specific vehicle type, the electric energy storage section comprises a battery with a capacity large enough to afford the vehicle a basic range without replenishment of the battery's charge either by the vehicle's heat energy converter section or by an external energy source, being said range between 5 and 50 km.

* * * * *